(12) United States Patent
Sekiguchi et al.

(10) Patent No.: US 7,504,629 B2
(45) Date of Patent: Mar. 17, 2009

(54) IMAGE FORMING APPARATUS

(75) Inventors: Ryota Sekiguchi, Kawasaki (JP);
Takeaki Itsuji, Hiratsuka (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 12/038,333

(22) Filed: Feb. 27, 2008

(65) Prior Publication Data

US 2008/0217536 A1 Sep. 11, 2008

(30) Foreign Application Priority Data

Mar. 7, 2007 (JP) ............................. 2007-056721

(51) Int. Cl.
*G02B 26/10* (2006.01)
(52) U.S. Cl. .................................. 250/334
(58) Field of Classification Search .................. 250/334
See application file for complete search history.

(56) References Cited

U.S. PATENT DOCUMENTS

| | | | | |
|---|---|---|---|---|
| 5,105,270 A | * | 4/1992 | Takahashi et al. | 348/551 |
| 5,623,145 A | | 4/1997 | Nuss | 250/330 |
| 5,710,430 A | | 1/1998 | Nuss | 250/358.1 |
| 2002/0067480 A1 | | 6/2002 | Takahashi | 356/317 |
| 2007/0228280 A1 | * | 10/2007 | Mueller | 250/341.1 |
| 2008/0006767 A1 | * | 1/2008 | Taday et al. | 250/252.1 |

FOREIGN PATENT DOCUMENTS

JP   08-320254   12/1996

WO   00/79248   12/2000

OTHER PUBLICATIONS

Yamashita et al., "Backside observation of MOSFET chips using an infrared laser THz emission microscope,", 2005, IEEEthe Joint 30th International conference on infared and millimeter waves and 13[13] international conference on Terahertz electronics, vol. 2, pp. 642-643.*

* cited by examiner

*Primary Examiner*—David P Porta
*Assistant Examiner*—Kiho Kim
(74) *Attorney, Agent, or Firm*—Fitzpatrick, Cella, Harper & Scinto

(57) ABSTRACT

An image forming apparatus includes an electromagnetic wave radiating portion, an electromagnetic wave detecting portion, a driving portion, a periodical signal generating portion for generating plural periodical signals, a memory portion, a processing portion, and an image forming portion. The driving portion changes the relative positional relationship between an object and the radiating portion. The detecting portion acquires transmitted or reflected wave from the object, as a time-series detection signal. The processing portion executes a process of multiplying the detection signals of the areas of the object with the periodical signals, and a process of adding the multiplied results and causing the memory portion to store the added results. The image forming portion forms an image of at least a portion of the object, based on information stored in the memory portion corresponding to the periodical signals, after the acquisition of the time-series detection signal, and the processes executed by the processing portion are repeated plural times for the areas of the object.

7 Claims, 9 Drawing Sheets

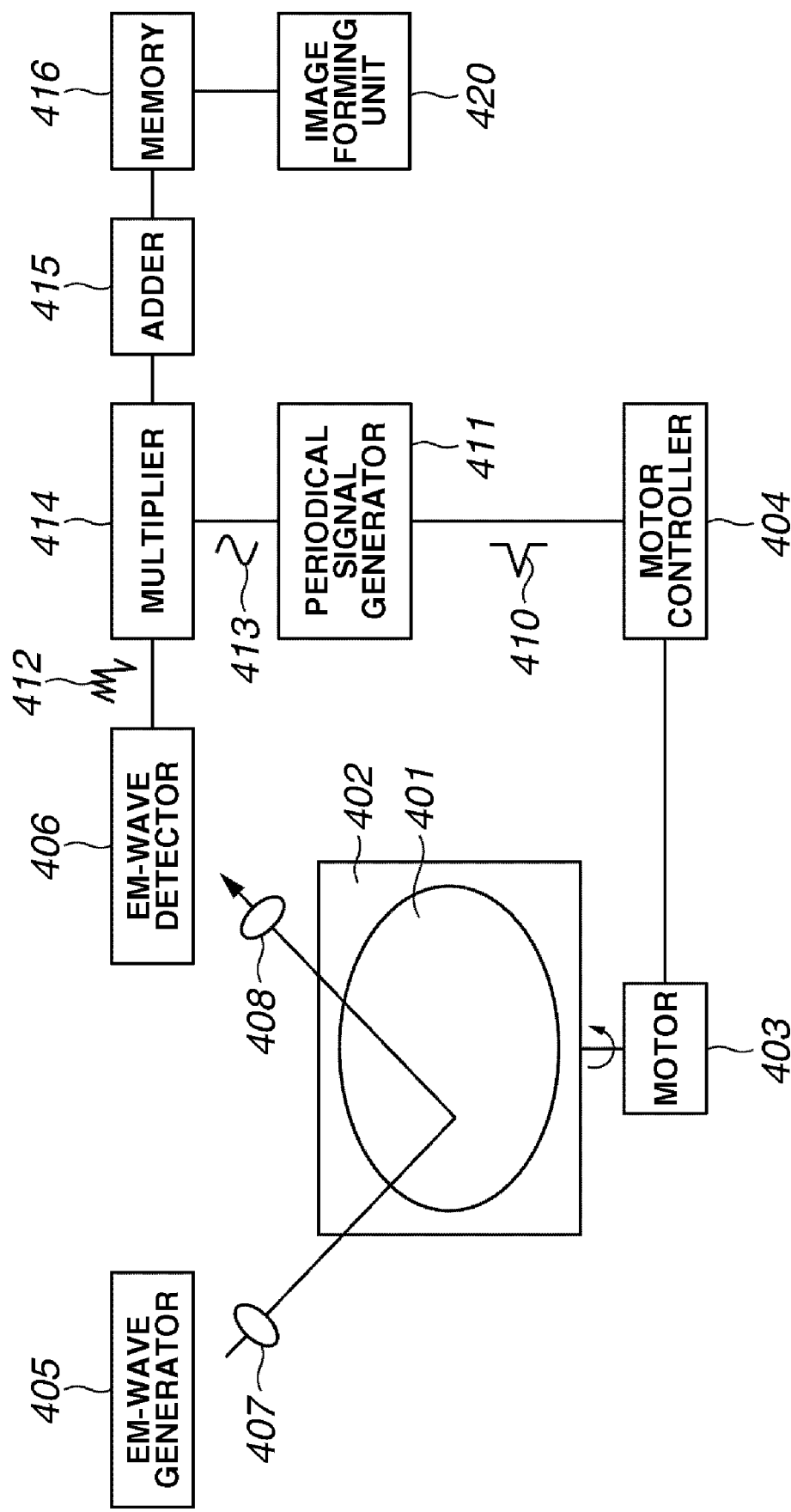

IMAGE FORMING APPARATUS

BACKGROUND OF THE INVENTION

1. Field of the Invention

The present invention relates to an image forming apparatus for forming an image by using detection of reflected or transmitted electromagnetic (EM) wave obtained by irradiation of a target object with electromagnetic wave, and particularly to an image forming apparatus using EM-wave in a frequency range between about 30 GHz and about 30 THz. In this specification, terahertz (THz) wave or millimeter wave is used for electromagnetic wave in the frequency range between about 30 GHz and about 30 THz.

2. Description of the Related Art

In recent years, the image forming having been widely performed in a light frequency range is also considered to be important in a THz wave frequency range. The reason therefore is that the transmissivity of THz wave for certain objects is relatively strong, different from light. This characteristic can be employed in a useful way.

In the THz wave frequency range, however, the speed of development of devices, such as a THz wave generator and a THz wave detector, is relatively slow. Accordingly, the following methods have been typically used for the image forming in the THz wave frequency range.

In one method, electromagnetic wave in the THz-wave frequency range is condensed into a point in an object to be imaged, and the point is moved relatively to the object to obtain the image thereof. This method is different from a method of obtaining a two-dimensional image at a time, and does not necessarily require a strong irradiation with the THz wave generator and a highly sensitive detection with the THz wave detector. Therefore, this method is frequently used.

JP 08-320254 A discloses the above image forming method. In a method disclosed therein, electromagnetic wave is condensed into a certain area of the object, the object is moved relatively to the condensed electromagnetic wave, and the condensed electromagnetic wave is caused to pass plural areas of the object. Transmission conditions of the electromagnetic wave through the plural areas are detected, and the detection signals are processed by an image forming unit or portion to acquire an image of the object. The condensation is executed since a signal-to-noise ratio (SN ratio) between detection signal and noise is low. The SN ratio is increased by the condensation of the THz wave.

When the state of the THz-wave condensation onto a certain area of the object is caused to last for a given period of time to accumulate plural detection signals, the SN ratio is further increased by the effect of averaging the accumulated signals. Accordingly, the image is typically formed in such a manner.

In the above method, however, it takes a considerable time to accumulate the plural detection signals. Therefore, there is the relationship of tradeoff between the improvement of SN ratio and the time required to form the image.

The tradeoff relationship also exists in a time-resolved spectroscopy called a terahertz time domain spectroscopy (THz-TDS) that differs from the image forming apparatus. Occurrence of the tradeoff relationship is due to performance of time resolution of a pulse waveform emitted from a photoconductive switch in the THz-TDS. When obtaining the pulse waveform, the time resolution should be conducted for a point of the pulse waveform while accumulating plural values to improve the SN ratio. Such operation leads to the occurrence of the tradeoff relationship.

To solve the above disadvantage, WO 00/079248 A1 proposes a method in which the improvement of SN ratio and a decrease in the time required obtain the pulse waveform are achieved by using a process of periodically obtaining pulse waveforms. For this purpose, delay time for a point of the pulse waveform is periodically changed. With the pulse waveform thus obtained, the bandwidth can be restricted by a spectrum analyzer or the like, and the SN ration can be improved.

However, though the determination of restriction of the bandwidth is relatively easy in the above method using the process of periodically obtaining pulse waveforms, the determination of restriction of the bandwidth is not easy in forming the image. While the bandwidth for the pulse waveform can be predicted in advance, the bandwidth of a transmissivity distribution or reflectance distribution of the object to be imaged generally depends on each individual object, and cannot be predicted in advance. Therefore, in the field of the image forming, there exists a demand for achieving both the improvement of SN ratio and a decrease in the time required to form the image.

SUMMARY OF THE INVENTION

According to one aspect of the present invention, there is provided an image forming apparatus including an electromagnetic (EM) wave radiating portion, an electromagnetic (EM) wave detecting portion, a driving portion for periodically changing a relative positional relationship between an object to be imaged and the EM-wave radiating portion, a periodical signal generating portion for generating plural periodical signals, including a fundamental wave or its harmonics, in synchronization with the period of the change in the relative positional relationship, a memory portion including plural memory parts, a processing portion, and an image forming portion. The driving portion time-divides the object into plural areas by the periodical change in the relative positional relationship. The EM-wave detecting portion acquires transmitted wave or reflected wave as a time-series detection signal. The transmitted wave or reflected wave is obtained by irradiation of each area of the object with electromagnetic wave from the EM-wave radiating portion.

The processing portion executes a process of respectively multiplying the time-series detection signal, which are obtained at times corresponding to the respective areas of the object, with the plural periodical signals, and a process of adding the multiplied results and causing the parts of the memory portion, which are respectively provided for the plural periodical signals, to store the added results. The image forming portion forms an image of at least a portion of the object, based on information respectively stored in the parts of the memory portion corresponding to the plural periodical signals, after the acquisition of the time-series detection signal by the EM-wave detecting portion, and the processes executed by the processing portion are repeated plural times for the plural areas, respectively.

According this invention, as will be understood from a description later described, it is possible to appropriately restrict the bandwidth, and achieve both the improvement of SN ratio and a decrease in the time required to form the image.

Further features of the present invention will become apparent from the following description of exemplary embodiments with reference to the attached drawings.

BRIEF DESCRIPTION OF THE DRAWINGS

FIG. 4 is a view showing the construction of an image forming apparatus of Embodiment 1 according to the present invention.

DESCRIPTION OF THE EMBODIMENTS

Embodiments of an image forming apparatus of the present invention will hereinafter be described with reference to the drawings. Initially, the principle of forming an image used in image forming apparatuses according to the present invention will be described.

It is herein assumed that the relative positional relationship between an object to be imaged, an EM-wave radiating portion, and an EM-wave detecting portion is periodically changed by an appropriate driving portion, and transmitted wave or reflected wave from the object is acquired as time-series detection signal for time-divided plural areas of the object, respectively.

The above relative positional relationship is periodically changed to change the relative positional relationship between the object and an EM-wave radiation part in the EM-wave radiating portion. When the relative positional relationship between the object and the EM-wave radiation part is changed by the movement of the object, the object is necessarily moved relative to the EM-wave detecting portion. Here, the EM-wave radiation part means a port whereat electromagnetic wave actually emits from the EM-wave radiating portion.

Figure 1:
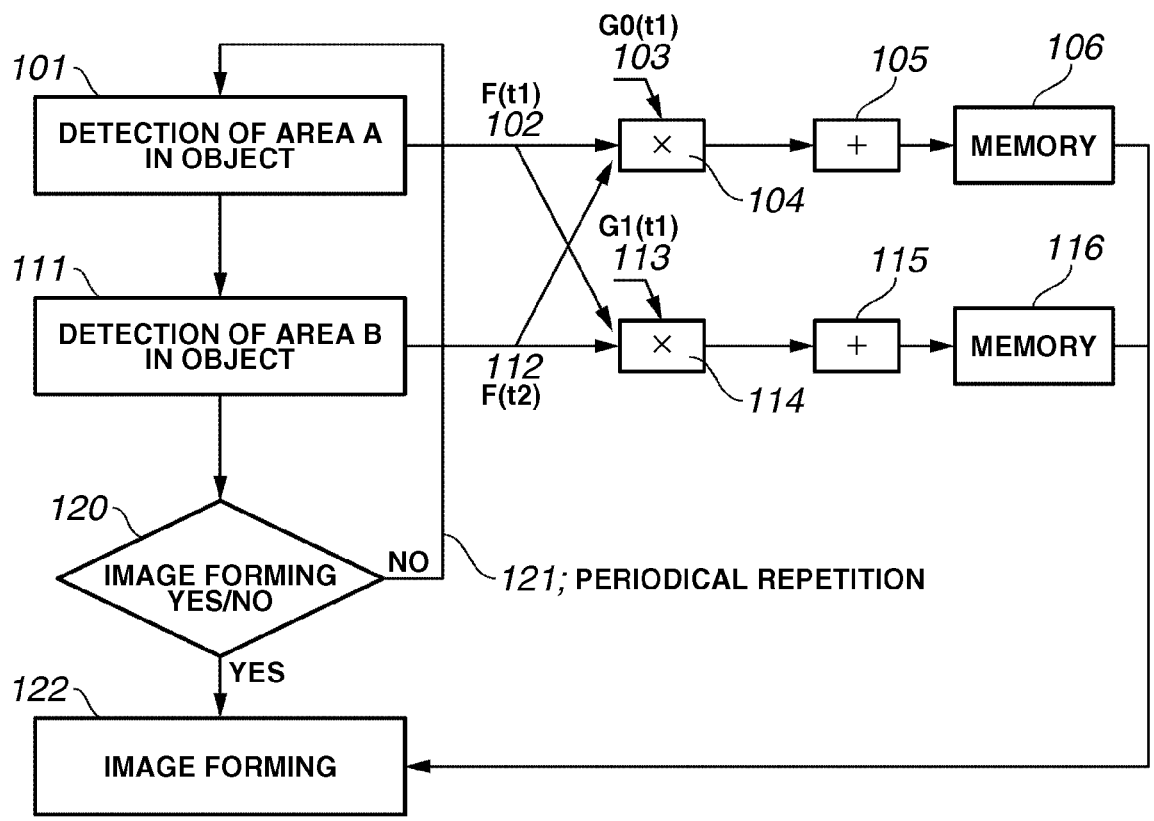
FIG. 1 is a view including a flow chart for explaining the principle of the present invention for forming the image of an object.

FIG. 1 shows a flow chart in which the image forming is performed according to the image forming principle, based on the time-series detection signal $F(t)=(F(t_1), F(t_2), \ldots)$. In FIG. 1, for the convenience of easy understanding, the number of areas of the object is two, area A and area B. A large number of areas are naturally needed to increase a resolution of the image of the object.

The areas A and B are time-divided areas, respectively. Time-division can be readily achieved when the relative positional relationship between the object and the EM-wave radiation part is changed as described above.

Detection signal $F(t_1)$ 102 of the area A and detection signal $F(t_2)$ 112 of the area B of the time-series detection signal $F(t)$ can be obtained by detection 101 of the area A and detection 111 of the area B, respectively. The periodical change of the relative positional relationship between the object and the EM-wave radiation part means a periodical repetition of "a unit of relative positional change" illustrated in FIG. 1. A lead line 121 in FIG. 1 indicates such a periodical repetition. Accordingly, the time-series detection signal $F(t)$ is a detection signal in which above $F(t_1)$ and $F(t_2)$ are periodically repeated plural times. The periodical repetition 121 is continued until "yes" appears in a judging step 120 of judging if the image forming to be executed.

As described above, in the present invention, the driving portion periodically changes the relative positional relationship between the object and the EM-wave radiation part of the EM-wave radiating portion. The driving portion time-divides the object into plural areas by the periodical change of the relative positional relationship. The EM-wave detecting portion acquires the transmitted wave or reflected wave appearing when each area of the object is irradiated with the electromagnetic wave from the EM-wave radiating portion, as each detection signal of the time-series detection signal.

In each period of the periodical repetition 121, the time-series detection signal $F(t)$ is processed in the following manner. The frequency of the periodical repetition 121 is assumed to be "f". For example, the object is rotated at frequency "f", or the object is moved in a reciprocating manner at frequency "f".

In the first place, the following process is performed at time $t_1=0$ (or $t_{2m+1}=0+m/f$, m; integer indicating time in (m+1)-th period). The detection signal $F(t_1)$ 102 including the EM-wave transmission condition of the area A is multiplied with a periodical signal $G_0(t_1)$ 103 (e.g., $G_0=\frac{1}{2}(DC)$) by a multiplier 104. The multiplied signal is added to another by an adder 105, and the added signal is stored in a memory 106. Further, the detection signal $F(t_1)$ 102 is multiplied with a periodical signal $G_1(t_1)$ 113 (e.g., $G_1=\cos(2\pi ft)$, fundamental wave) by a multiplier 114. The multiplied signal is added to another by an adder 115, and the added signal is stored in a memory 116.

Then, the following process is performed at time $t_2=\frac{1}{2}f$ (or $t_{2m+2}=\frac{1}{2}f+m/f$, m; integer indicating time in (m+1)-th period). The detection signal $F(t_2)$ 112 including the EM-wave transmission condition of the area B is multiplied with the periodical signal $G_0(t_2)$ 103 by the multiplier 104. The multiplied signal is added to another by the adder 105, and the added signal is stored in the memory 106. Further, the detection signal $F(t_2)$ 112 is multiplied with the periodical signal $G_1(t_2)$ 113 by the multiplier 114. The multiplied signal is added to another by the adder 115, and the added signal is stored in the memory 116.

Each of the adders 105 and 115 supplies the value to be added itself to the memory 106 or 116 when the value stored in the memory 106 or 116 is zero. When the value stored in the memory 106 or 116 is not zero, the summation of the value to be added and the non-zero value is stored in the memory 106 or 116.

The above processing corresponds to a successive performance of the Fourier development in which each Fourier component is demodulated into a given signal (DC) by convolution. Accordingly, as the periodical signal, selected is a sine-wave signal, cosine-wave signal, or the like whose frequency is equal to that of the Fourier component to be acquired. As the periodical signal, plural periodical signals in synchronization with the periodical repetition conducted by the driving portion are selected. Further, plural periodical signals, including a fundamental wave or its harmonics, in synchronization with the period of the change in the above relative positional relationship are selected. The periodical signal includes the DC in a broad sense such that the DC signal contained in F(t) of the time-series detection signal can be demodulated.

For example, $F(t)=A*\cos(2\pi ft)$ is assumed where the integration over a period of the time-series detection signal F(t) and the periodical signal $G_1(t)$ is indicated by $\int$. Then, $\int F(t)*G_1(t)dt=A/2$, and the Fourier component "A" of the frequency equal to that of $G_1(t)$ contained in the time-series detection signal F(t) can be extracted.

In the construction illustrated in FIG. 1, only two Fourier components are present, so that the Fourier components for the DC are added and stored in the memory 106, and the Fourier components for the frequency "f" are added and stored in the memory 116.

In other words, a processing portion, such as the multiplier and the adder, executes a process of respectively multiplying the time-series detection signal, which are obtained at times corresponding to the respective areas of the object, with the plural periodical signals, and a process of adding the multiplied results and causing parts of the memory portion, which are respectively provided for the plural periodical signals, to store the added results. The acquisition of the time-series detection signal by the EM-wave detecting portion, and the process executed by the processing portion are repeated plural times for the plural areas of the object, respectively. The repetition can be achieved, for example, by conducting "a unit of relative positional change" plural times with the driving portion.

Figure 2A:
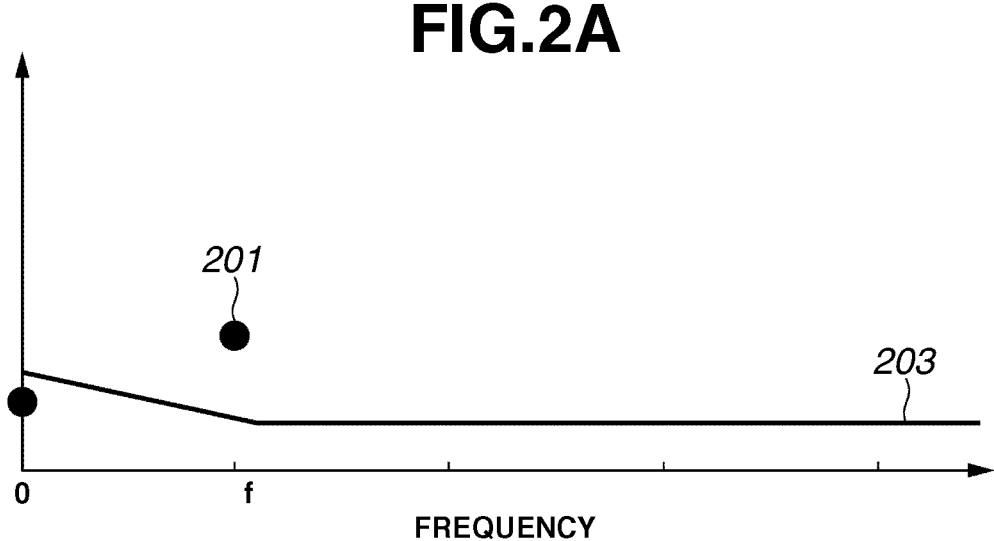
FIGS. 2A to 2C are graphs for explaining the relationship between the time-series detection signal and the bandwidth in the present invention.
Figure 2B:
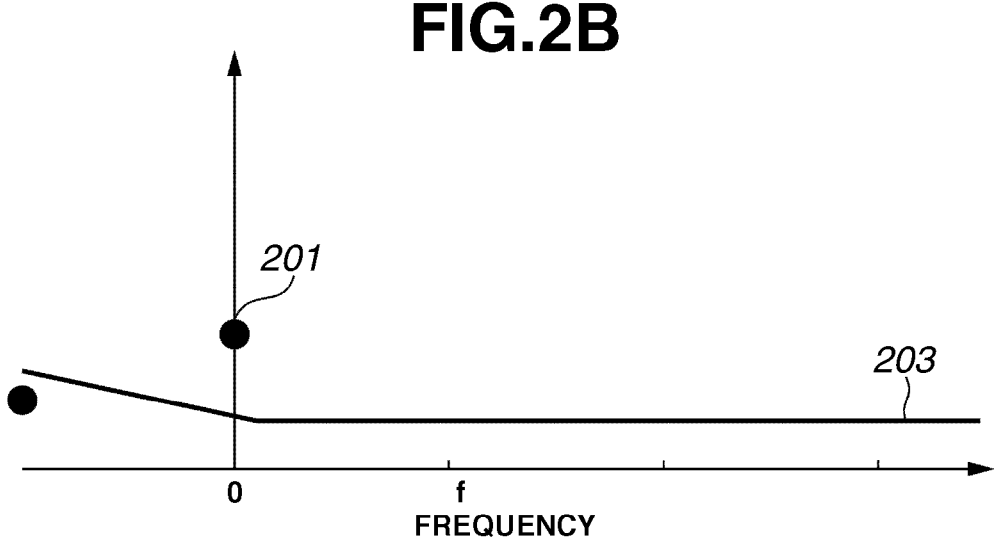
Figure 2C:
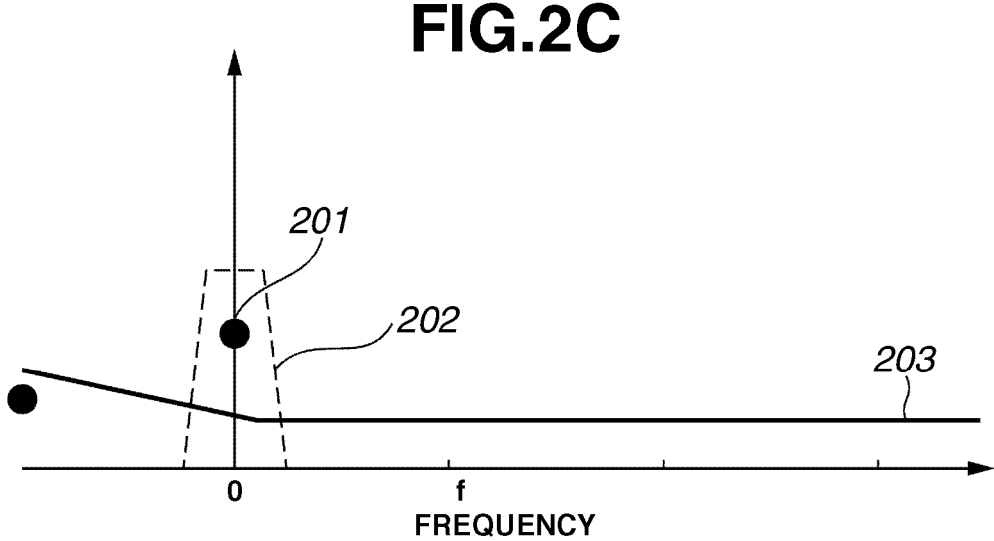

The periodical repetition 121 is performed as described above to obtain the effect of averaging of accumulation of the Fourier components. This process substantially corresponds to a process of carrying out band-filtering each Fourier component. As the number of accumulation increases, the band-pass bandwidth becomes narrower. Resultantly, measuring bandwidths are automatically restricted to vicinities of the Fourier components corresponding to the DC and the frequency "f", respectively. Accordingly, an appropriate limitation of the noise bandwidth can be achieved. FIGS. 2A to 2C show this fact. FIGS. 2A to 2C illustrate the relationship between the bandwidth and the time-series detection signal in which only the Fourier component of the frequency "f" in F(t) is highlighted.

The Fourier component 201 of the time-series detection signal originally exists at frequency "f", as illustrated in FIG. 2A. When the convolution is performed between the Fourier component 201 and the periodical signal of the frequency "f", the Fourier component 201 of the frequency "f" is demodulated to the DC, as illustrated in FIG. 2B. Further, when the accumulation (or averaging of the accumulation) is performed with the periodical repetition 121, the measuring bandwidth 202 is restricted, as illustrated in FIG. 2C.

FIGS. 2A to 2C illustrates typical noise 203 in which the 1/f noise is superimposed on the white noise that appears over overall frequencies. When the frequency "f" can be set a value over 100 Hz, the 1/f noise in the Fourier component 201 of the time-series detection signal can be effectively reduced. This is due to the fact that the 1/f noise is generally large in a range between about DC and about 100 Hz.

The following process is performed to form the image of the object. When the SN ratio reach a sufficient value and "yes" appears in the judging step 120, an inverse Fourier expansion of values stored in the memories 106 and 116 is executed by the image forming portion. The reason for that is that an assemblage of the Fourier components is in the form of a reciprocal lattice spatial image. When this assemblage is developed into a real space, the image forming 122 is achieved. In the case where the reciprocal lattice spatial image is rather desired (e.g., in the case of analysis of a periodical structure), no inverse Fourier expansion is needed.

The image forming portion thus forms at least a portion of the object, based on information respectively stored in the plural parts of the memory portion provided corresponding to the plural periodical signals.

The construction of FIG. 1 can be generalized by changing the number of areas of the object to be imaged to "N". In this case, periodical signals include the fundamental wave of the frequency "f", double wave, triple wave, . . . , (N−1)-fold wave, and the Fourier components of each detection signal for each area corresponding to DC, f, 2f, 3f, . . . , (N−1)f are similarly processed. Accordingly, the structure of this case is expanded to a construction including N memory parts, N multipliers, and N adders. It is preferable to use memory function and processing function of a personal computer (PC), or the like for functions of N memory parts, N multipliers, and N adders.

Figure 3A:
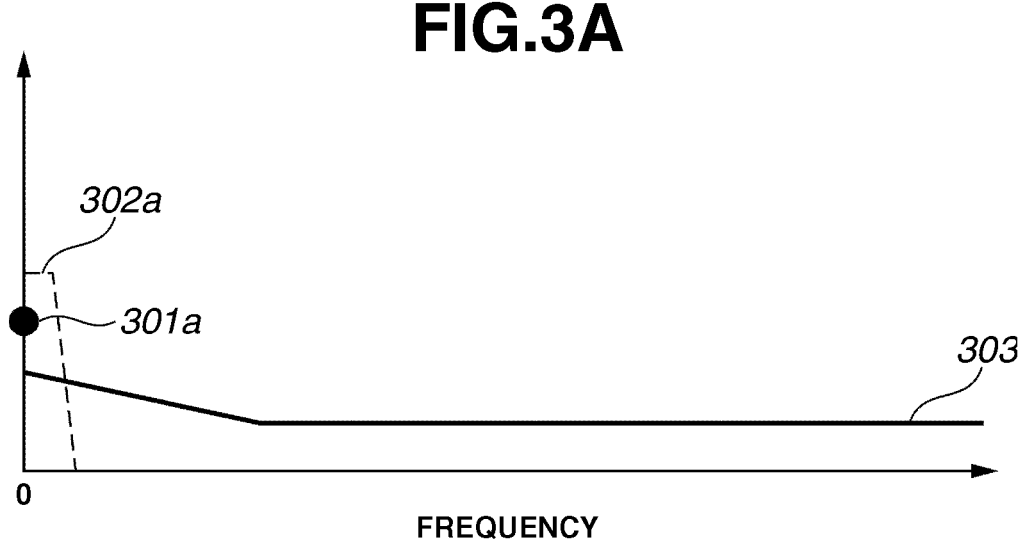
FIGS. 3A to 3C are graphs for explaining the relationship between the time-series detection signal and the bandwidth in the present invention in comparison with those of conventional examples.
Figure 3B:
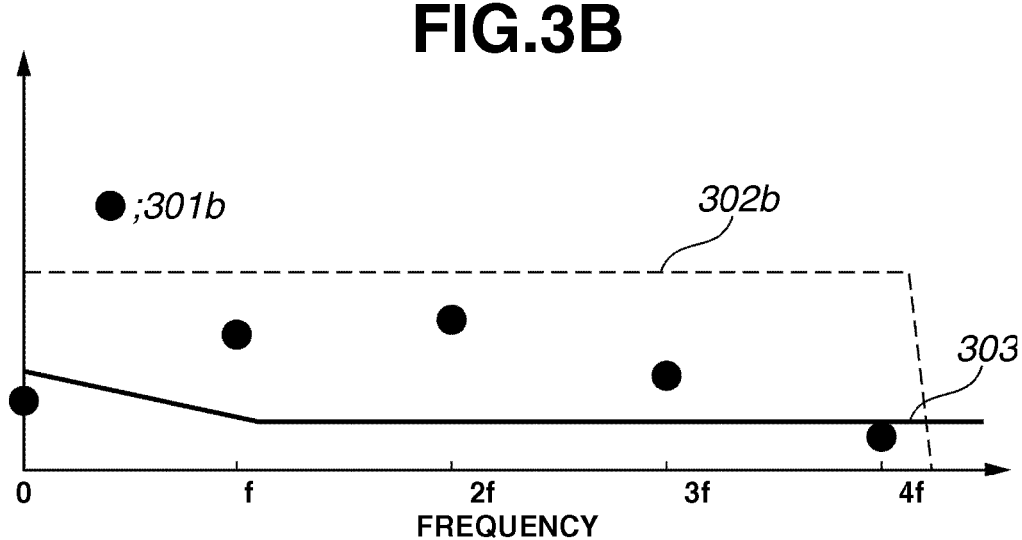
Figure 3C:
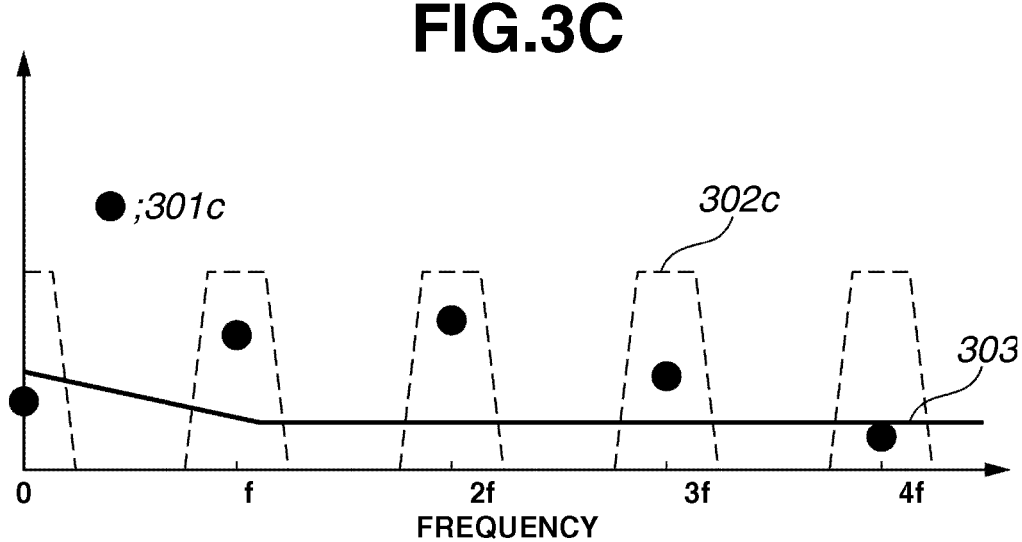

FIGS. 3A to 3C show the relationship between time-series detection signal and bandwidth at the time of forming the image by the image forming apparatus or method of the present invention, comparing to those of conventional examples.

FIG. 3A shows the relationship between the detection signal 301a containing the EM-wave transmission condition in a certain area of the object, and the bandwidth 302a in an image forming method of the above JP 08-320254 A. In this case, the detection signal 301a can be defined as DC. Accumulation (or averaging of the accumulation) corresponds to restriction of measurement to the bandwidth 302a. Since the 1/f noise is generally large in the vicinity of DC, it can be seen from FIG. 3A that this method is not suitable for the improvement of SN ratio.

FIG. 3B shows the relationship between the pulse-shaped time-series detection signal 301b and the bandwidth 302b in a pulse waveform obtaining method of the above WO 00/079248 A1. In this case, the time-series detection signal 301b is a periodical function, and can be defined as Fourier components at DC, frequency "f", and its harmonics. It can be seen from FIG. 3B that restriction of the bandwidth 302b is difficult to achieve unless the coverage of band of the pulse waveform is beforehand known as the time-series detection signal 301b.

FIG. 3C shows the relationship between the time-series detection signal 301c containing the EM-wave transmission conditions of the time-divided areas in the object, and the bandwidth 302c in the image forming apparatus or method of the present invention. In this case, the time-series detection signal 301c is a periodical function, and can be defined as Fourier components of DC, frequency "f", and its harmonics. The time-series detection signal 301c is convoluted by each of periodical signals of the frequency "f" and its harmonics, and converted to DC. Then, accumulation is performed. Accumulation (or averaging of the accumulation) corresponds to restriction of measurement to the bandwidth 302c.

Therefore, white noise and 1/f noise can be effectively reduced, as illustrated in FIG. 3C. On the assumption that accumulation is conducted the same times, the bandwidth 302c becomes equal to the bandwidth 302a. Accordingly, SN ratios are improved in the case of FIG. 3C more than in the case of FIG. 3A, in at least Fourier components other than the Fourier component at DC. This means that both the improvement of SN ratio and a decrease in the time required to form the image can be achieved in almost all objects, except an object wherein the EM-wave transmission condition is uniform (i.e., to give a simple example, a uniformly painted object). FIGS. 3A to 3C also illustrate the typical example with the noise 303 in which the 1/f noise is superimposed on the white noise that appears in the overall frequency range.

In the above construction, there is further provided a portion for periodically changing the relative positional relationship between the object, the EM-wave radiating portion, and the EM-wave detecting portion. In the case of FIG. 1, the driving portion is provided for periodically repeating the detection 101 of the area A and the detection 111 of the area B plural times.

As described in the foregoing, it is preferable to provide the driving portion capable of achieving the periodical change, especially a fast periodical change, in the relative positional relationship such that the frequency "f" can be increased to improve the SN ratio. To raise a simple example, the driving portion, such as an actuator for converting electrical energy to kinetic energy, is used to move the object relatively to the EM-wave radiating portion and the EM-wave detecting portion. It is preferable to select a rotary motion, and fix the object on a support member that can be rotated by an electromagnetic motor or the like to rotate the object. In this case, the periodical signal can be created by using a control signal for the motor as a trigger signal.

The above-described portions can be readily expanded to those capable of use in a construction wherein the number of areas in the object is N. Description will hereinafter be made to more specific embodiments.

Embodiment 1 will be described. FIG. 4 illustrates Embodiment 1 of the image forming apparatus according to the present invention. In FIG. 4, an object 401 to be imaged is supported by a support member 402, and the support member 402 can be rotated with the object 401 by an electromagnetic motor 403. The rotary motion by the motor 403 can be performed at a relatively high rate. For example, a periodical motion at a frequency over 100 Hz (i.e., 6000 rpm (rounds per minute) can be stably executed. The motor 403 is, therefore, a preferable driving portion for the image forming apparatus of the present invention. Thus, the relative positional relationship between the object 401, an electromagnetic radiating portion 405, and an electromagnetic detecting portion 406 can be periodically changed with a rotation being "a unit of relative positional change".

The number of rotations or the frequency of the motor 403 of the driving portion is controlled by a motor controller 404. The motor 403 can be a servo motor, and the motor controller 404 can be comprised of a programmable controller (PLC) for generating pulses determining the number of rotations, an amplifier, and an encoder for performing the feedback control. In this embodiment, the frequency f=100 Hz, and the relative positional relationship between the object 401, the electromagnetic radiating portion 405, and the electromagnetic detecting portion 406 can be changed at the frequency f=100 Hz. Referring to a trigger signal 410 extracted from the motor controller 404, a periodical signal generator 411 generates periodical signals 413, such as the fundamental wave of f=100 Hz and its harmonics, in synchronization with the trigger signal 410. For example, when the trigger signal 410 is taken into the PC or the like, it is possible to construct the periodical signal generator by the control program of the PC.

In this embodiment, the radiating portion 405 is a portion for radiating the THz wave, for example, a backward wave oscillator (BWO). The detecting portion 406 is a Schottky barrier diode with a single pixel, for example. In this embodiment, as illustrated in FIG. 4, the THz wave is condensed by a condenser 407, such as a lens, and the object 401 is irradiated with the condensed wave. The THz wave reflected by the object 401 is also condensed by a condenser 408, such as a lens, and the thus-condensed wave is detected by the detecting portion 406. A time-series detection signal 412 is thus created by the detecting portion 406.

The time-series detection signal 412 containing the EM-wave transmission conditions of the time-divided areas in the object 401 is processed by a processing portion in the above-described manner. The detection signals are multiplied with the plural periodical signals 413 by the multipliers 415, respectively, and the multiplied results of each Fourier component corresponding to each periodical signal 413 are added and stored in each memory 416. Further, a plurality of units of relative positional change are periodically repeated with the rotary motion of the motor 403, and accumulation (or averaging of the accumulation) is performed for each Fourier component.

Figure 5:
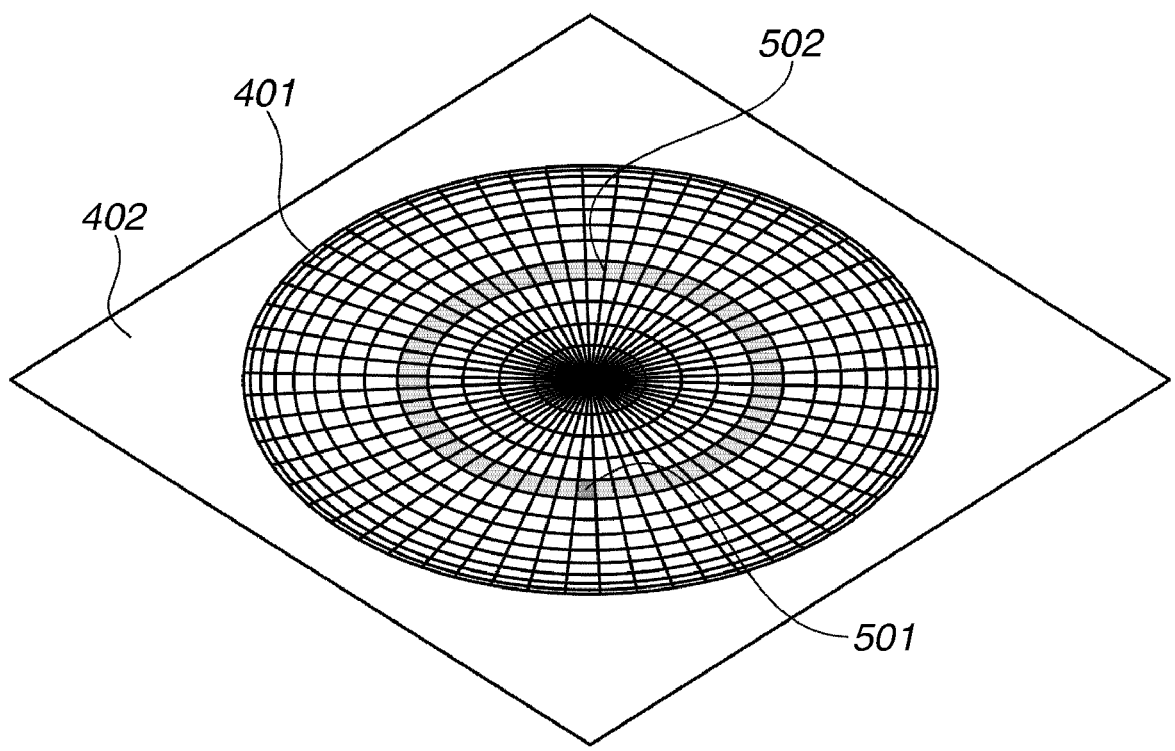
FIG. 5 is a view showing plural areas of an object to be imaged in Embodiment 1.

FIG. 5 illustrates a specific manner in which plural areas of the object 401 to be imaged are determined. An area 501 is irradiated with the THz wave from the radiating portion 405. A circular region 502 partitioned in a mesh-like form along a circumferential direction includes N time-divided areas of the object 401. In FIG. 5, N=58 in the circumferential direction, for example. The number "N" can be further increased, but there is an upper limit thereto. The number "N" is determined depending on the frequency "f" at which the relative positional relationship between the object 401, the radiating portion 405, and the detecting portion 406 is periodically changed. The reason therefore is that since calculation (multiplication and addition) is performed for each of the N areas plural times in the order of "N", it is desirable to adopt such an appropriate "N" that the time required to conduct at least the calculation does not bottleneck the image forming.

Simple calculation will be conducted tentatively for a construction in which the multiplier 414 and the adder 415 of the processing portion are comprised of the PC whose calculation capability is 1 GFLOPS (one billion calculations per one second). On this assumption, it takes 1 nanosecond to do a single calculation, and the time required to perform one-period processing is $N^2$ nanoseconds.

On the other hand, one period in this case is 10 msec=1/(100 Hz). Accordingly, "N" is estimated to be less than 3162 in order not to bottleneck the time of calculation. It is, however, considered that "N" can be more than 3162 since a parallel computer or a processing chip specifically designed for such processing can be employed.

In this embodiment, the PC is used as an image forming portion 420 for forming the image. Judgment of sufficiency of the SN ratio can be performed by setting an appropriate threshold for the SN ratio with respect to a certain Fourier component. Alternatively, the judgment can be performed as follows. The reciprocal lattice spatial image is developed into a real space every tenth period, for example, by using a fast FFT for the inverse Fourier expansion. The judgment is conducted in reference to such development.

In order to form the image of almost all the object 401, the irradiation area 501 irradiated with the THz wave from the radiating portion 405 is changed in a radial direction of the rotary motion. The image forming is conducted in the same manner at every location in the radial direction. In this embodiment, only an area whereat the radius is zero, i.e., an area on the rotary axis, is a singular point whereat the relative positional relationship between the object 401, the radiating portion 405, and the detecting portion 406 remains unchanged.

In this embodiment, the radiating portion 405 is not limited to the BWO. It can be a quantum cascade laser (QCL), a resonant tunnel diode (RTD), a Gunn diode, or the like. Further, an incoherent photoconductive switch can also be used. The detecting portion 405 is not limited to the Schottky barrier diode. It can be a micro-bolometer, a pyroelectric device, a photo-acoustic device, a bolometer, or the like. Further, an incoherent photoconductive switch can also be used as the detecting portion.

Although the frequency of the electromagnetic wave is not limited, the frequency range between 30 GHz and 30 THz (frequencies of millimeter wave and terahertz wave) is considered to be preferable. In such a frequency range, the development of devices, such as the generator and the detector, is relatively delayed, and the SN ratio is relatively small. The reason for such preferability is as follows. For example, assumed that accumulation (or averaging of the accumulation) is performed to increase the SN ratio by ten times, the accumulation needs to be conducted 100 times more than the original accumulation. Since the number of accumulation is proportional to the time required to form the image, it takes 100 times longer time to perform the accumulation (or averaging of the accumulation) than the original accumulation. Accordingly, when an increase in the SN ratio is small, the time required to form the image is not lengthened so much, and is largely shortened. Therefore, the above construction brings forth a significant effect in the frequency range in which performances of the generator and the detector are relatively low.

Figure 6:
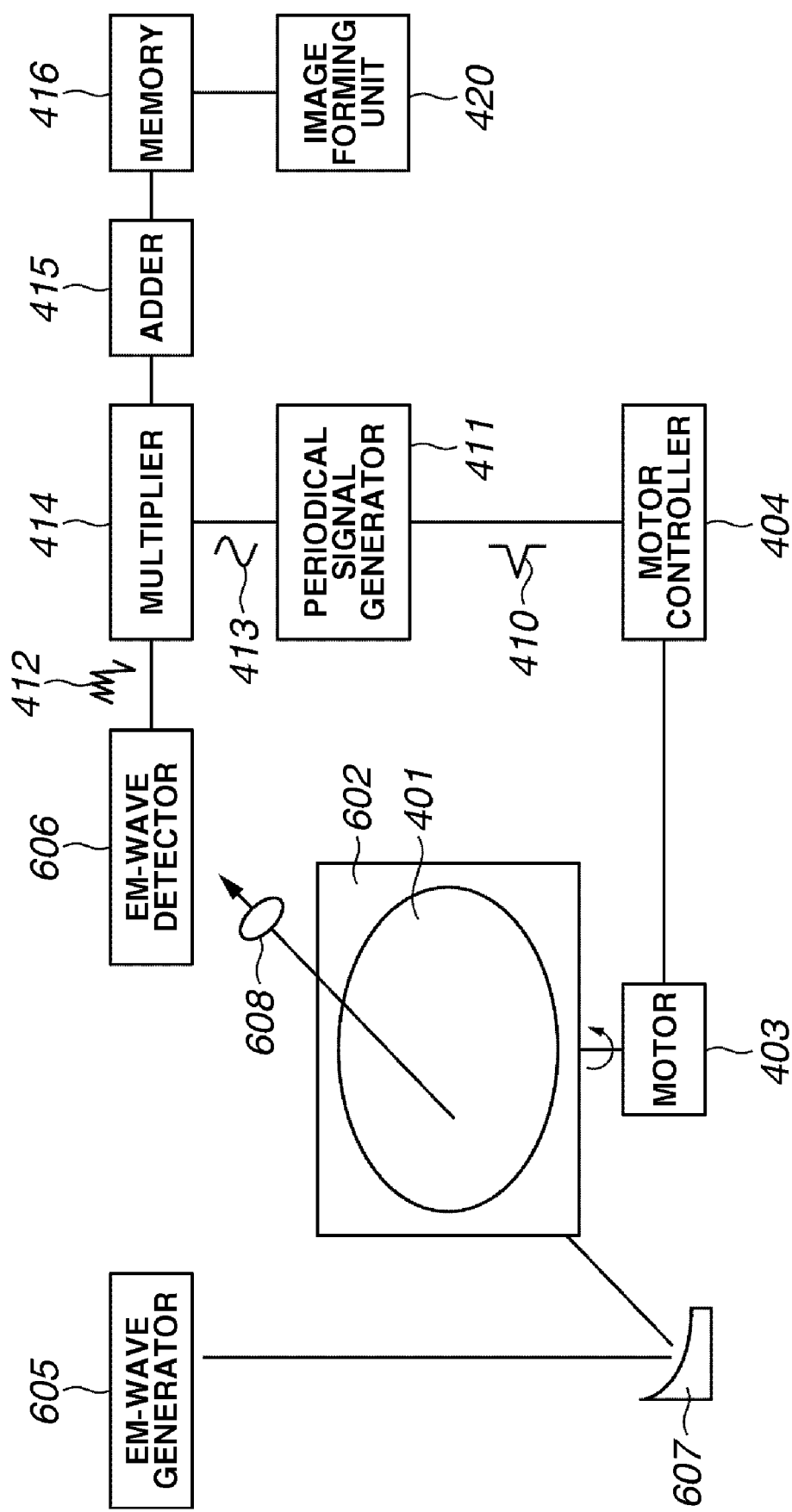
FIG. 6 is a view showing the construction of an image forming apparatus of a modification of Embodiment 1.

In the above construction, the electromagnetic wave reflected from the object is used. It is also possible to form the image by using the electromagnetic wave transmitted through the object 401. FIG. 6 illustrates such a construction wherein the electromagnetic wave is condensed by condensers 607 and 608. In this case, it is preferable to use a support member 602 that is as transparent as possible for the radiated electromagnetic wave. It is more preferable to use the support member 602 with a low dielectric constant whose Fresnel reflection loss is small. The support member 602 of benzocyclobutene (BCB) or polyimide can be preferably used in a range around the frequency of 30 GHz, though its use depends on the frequency range an EM-wave radiating portion 605 can supply and the frequency range in which an EM-wave detecting portion 606 has a high sensitivity. Around 1 THz, cycloolefin or BCB can be used. High resistance Si can also be used though its dielectric constant is a little larger than those of cycloolefin and BCB. Similarly, ZnSe or the like can be used around the frequency of 30 THz.

In Embodiment 1, an appropriate bandwidth limitation can be effected, and both the improvement of the SN ratio and a decrease in the time required to form the image can be achieved.

Figure 7:
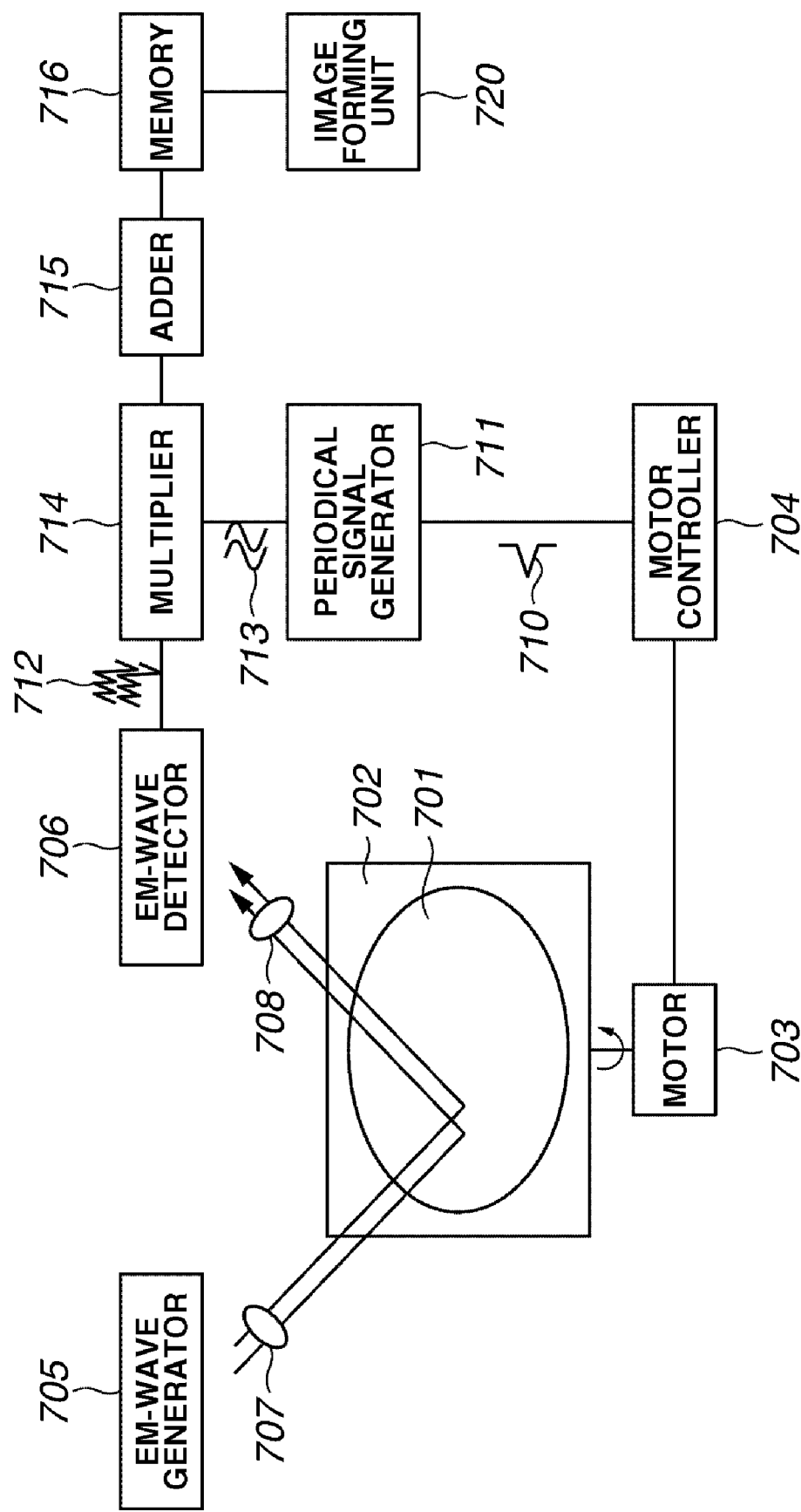
FIG. 7 is a view showing the construction of an image forming apparatus of Embodiment 2 according to the present invention.

Embodiment 2 will be described. FIG. 7 illustrates Embodiment 2 of the image forming apparatus according to the present invention. This embodiment uses an EM-wave detecting portion 706 with a plurality of pixels that are linearly arranged. The detecting portion 706 is comprised of an array type detector that is a so-called micro-bolometer array, for example. Accordingly, an EM-wave radiating portion 705 is comprised of the QCL, for example, and the THz wave radiated therefrom is shaped into a linearly elongated beam by a cylindrical lens 707. Such an elongated beam is illuminated on an object 701. In Embodiment 1, the scanning in the radial direction is necessary for the formation of the entire image of the object. In contrast, such scanning is unnecessary in Embodiment 2.

Other portions of this embodiment are similar to those of Embodiment 1. In FIG. 7, reference numeral 702 designates a support member, reference numeral 703 designates an electromagnetic motor, reference numeral 704 designates a motor controller, reference numeral 710 designates a trigger signal, and reference numeral 720 designates an image forming portion. In this construction, the electromagnetic wave reflected from the object 701 is also shaped into a linearly elongated beam by a cylindrical lens 708, and detected by the detecting portion 706. The detecting portion 706 generates a time-series detection signal 712. The thus-obtained time-series detection signal 712 is processed as described above.

In this embodiment, the number of the time-series detection signal 712 is equal to the number of the pixels in the detecting portion 706. Accordingly, the numbers of periodical signal generators 711, multipliers 714, adders 715, and memories 716 are increased, respectively. It is, however, easy for the PC to constitute those portions.

Figure 8:
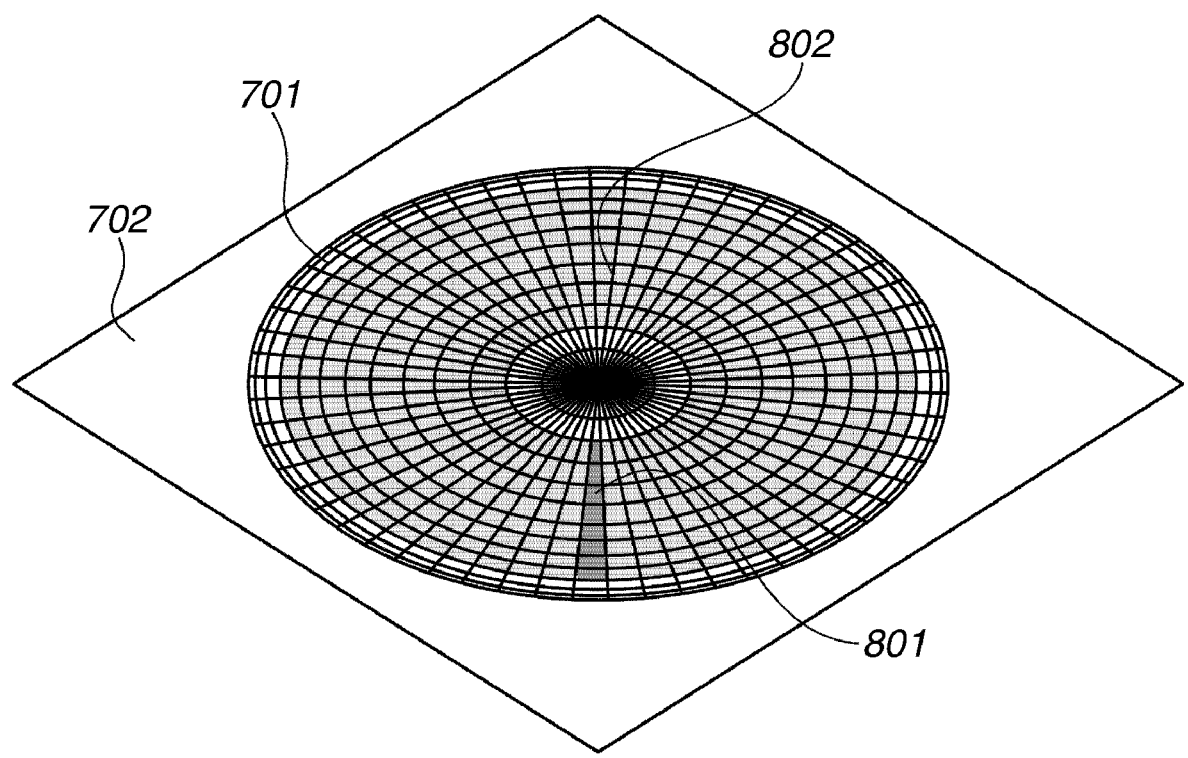
FIG. 8 is a view showing plural areas of an object to be imaged in Embodiment 2.

FIG. 8 illustrates a method of determining the area of the object 701 to be imaged in the above construction. In this case, the area irradiated with the electromagnetic wave from the radiating portion 705 is an elongated area 801 extending in the radial direction, for example. The area 801 corresponds to the area 501 in FIG. 5. In the circumferential direction, the image forming is conducted in the above-described manner. In a direction perpendicular to the circumferential direction, any irradiation pattern is permitted so long as the pattern corresponds to the number of pixels of the detecting portion 706, and can be irradiated with the linearly elongated beam. An imaging region 802 partitioned in the mesh-like form along the circumferential direction corresponds to the imaging region 502 in FIG. 5.

Also in this embodiment, only an area whereat the radius is zero, i.e., an area on the rotary axis, is a singular point whereat the relative positional relationship between the object 701, the EM-wave radiating portion 705, and the EM-wave detecting portion 706 remains unchanged. Regarding others, this embodiment is the same as Embodiment 1.

Figure 9:
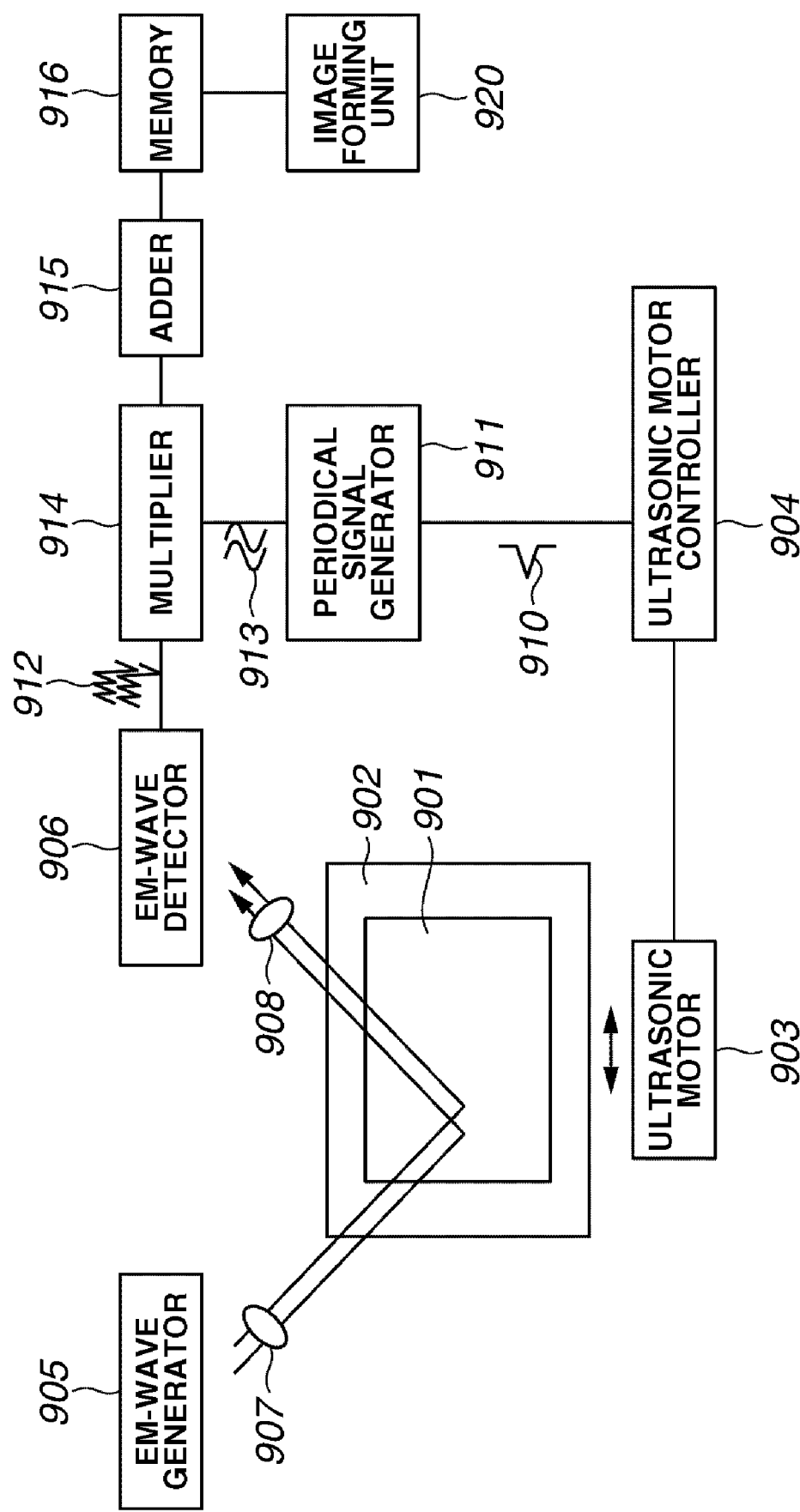
FIG. 9 is a view showing the construction of an image forming apparatus of Embodiment 3 according to the present invention.

Embodiment 3 will be described. FIG. 9 illustrates Embodiment 3 of the image forming apparatus according to the present invention. In this embodiment, an object 901 to be imaged is supported by a support member 902. The support member 902 with the object 901 can be moved in a translational and reciprocating manner by an ultrasonic motor 903. The translational and reciprocating movement is accompanied with acceleration and deceleration parts, so that the speed of this movement cannot be made very high for the purpose of achieving a periodical stable motion. On the other hand, this reciprocating movement does not accompany a rotary axis (or a singular point) that appears in the rotating movement in Embodiment 1. Accordingly, in the image forming apparatus of Embodiment 3, the image of the entire object can be formed.

In this embodiment, the relative positional relationship between the object 901, an EM-wave radiating portion 905, and an EM-wave detecting portion 906 is periodically changed with a unit of relative positional change being periodically repeated plural times. In this case, a unit of relative positional change can be one reciprocating movement, or each of forward motion and backward motion in a single reciprocating movement. In the former case, during the backward motion, radiation of the electromagnetic wave is intermitted, and a time-series detection signal 912 is not created. In the latter case, the scanning direction in the forward motion is opposite to that in the backward motion, so that processing and storing of information are performed considering such difference in the motions.

The frequency "f" of the ultrasonic motor 903 is controlled by an ultrasonic motor controller 904. In this embodiment, the frequency "f" set at 10 Hz. In the above former case, the relative positional relationship between the object 901, the EM-wave radiating portion 905, and the EM-wave detecting portion 906 is periodically changed at f=10 Hz. In the above latter case, the relative positional relationship is substantially changed at 20 Hz, i.e., the double of 20 Hz. A periodical signal generator 911 generates periodical signals 913, including the fundamental wave with the frequency of 10 Hz and its harmonics, in synchronization with a trigger signal 910 extracted from the motor controller 904. Even when the speed is not so high, for example, f=10 Hz, the 1/f noise can be reduced in the Fourier components of the harmonics with frequencies over 100 Hz. Therefore, even if the speed is increased only slightly, such increase is effective.

In the translational movement, different from the rotating movement, the relationship between displacement and time is difficult to be in the form of a sine-wave or cosine-wave. Accordingly, there is a case where the Fourier component is difficult to extract. It is, therefore, desirable to compensate for such difficulty, and create a compensated time-series detection signal. For example, the length of the reciprocating movement is made longer than the length of the object 901 in the direction of the reciprocating movement, and the electromagnetic wave beam is displaced on the object 901 at an approximately uniform rate. In such a construction, the time-series detection signal is obtained while discarding signals of the electromagnetic wave obtained at opposite end parts of the reciprocating movement.

In this embodiment, the EM-wave radiating portion 905 is comprised of a Gunn diode that radiates millimeter wave, for example. The EM-wave detecting portion 906 is comprised of a device having a plurality of Schottky barrier diodes with a single pixel that are linearly arranged. As in Embodiment 3, the millimeter wave radiated from the Gunn diode is shaped into a linearly elongated beam by a condenser 907, such as a cylindrical lens. Such an elongated beam is illuminated on the object 901. In this embodiment, the object 901 is irradiated with the linearly elongated beam extending in a direction perpendicular to the direction of the translational movement. Accordingly, as in Embodiment 2, the scanning for forming the entire image of the object is unnecessary in this embodiment. Further, there is no rotary axis or singular point in this embodiment, so that the entire image of the object can be obtained.

Other portions of this embodiment are similar to those of Embodiment 1. In FIG. 9, reference numeral 914 designates a multiplier, reference numeral 915 designates an adder, reference numeral 916 designates a memory, and reference numeral 920 designates an image forming portion. In this construction, the electromagnetic wave reflected from the object 901 is also shaped into a linearly elongated beam by a condenser, such as a cylindrical lens 708, and detected by the detecting portion 906. The detecting portion 906 generates the time-series detection signals 912. The thus-obtained time-series detection signals 912 are processed as described in the foregoing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims priority from Japanese Patent Application Nos. 2007-056721, filed Mar. 7, 2007, and 2008-045941, filed Feb. 27, 2008, which are hereby incorporated by reference herein in its entirety.

What is claimed is:

1. An image forming apparatus comprising:
   an electromagnetic wave radiating portion;
   an electromagnetic wave detecting portion;
   a driving portion for periodically changing a relative positional relationship between an object to be imaged and the electromagnetic wave radiating portion;
   a periodical signal generating portion for generating plural periodical signals, including a fundamental wave or its harmonics, in synchronization with the period of the change in the relative positional relationship;
   a memory portion including plural memory parts;
   a processing portion; and
   an image forming portion,
   wherein the driving portion time-divides the object into plural areas by the periodical change in the relative positional relationship, the electromagnetic wave detecting portion acquires transmitted wave or reflected wave, which is obtained by irradiation of each area of the object with electromagnetic wave radiated from the electromagnetic wave radiating portion, as a time-series detection signal, the processing portion executes a process of respectively multiplying the time-series detection signal, which are obtained at times corresponding to the respective areas of the object, with the plural periodical signals, and a process of adding the multiplied results and causing the memory parts of the memory portion, which are respectively provided for the plural periodical signals, to store the added results, and the image forming portion forms an image of at least a portion of the object, based on information respectively stored in the memory parts of the memory portion corresponding to the plural periodical signals, after the acquisition of the time-series detection signal by the electromagnetic wave detecting portion, and the processes executed by the processing portion are repeated plural times for the plural areas, respectively.

2. An image forming apparatus according to claim 1, wherein the driving portion periodically repeats a unit of relative positional change plural times.

3. An image forming apparatus according to claim 1, wherein the electromagnetic wave detecting portion comprises a detector with a single pixel, and the detector with a single pixel detects the transmitted wave or reflected wave from the object.

4. An image forming apparatus according to claim 1, wherein the electromagnetic wave detecting portion comprises a detector with plural pixels, and the detector with plural pixels detects the transmitted wave or reflected wave from the object.

5. An image forming apparatus according to claim 1, wherein the driving portion has a mechanism for rotating the object.

6. An image forming apparatus according to claim 1, wherein the driving portion has a mechanism for reciprocating the object in a translational manner.

7. An image forming apparatus according to claim 1, wherein a frequency of the electromagnetic wave radiated from in the electromagnetic wave radiating portion includes a frequency in a frequency range between 30 GHz and 30 THz.

* * * * *